US012130783B1

(12) United States Patent
Woollen et al.

(10) Patent No.: US 12,130,783 B1
(45) Date of Patent: Oct. 29, 2024

(54) PROVIDING ACCESS TO USAGE REPORTS ON A CLOUD-BASED DATA WAREHOUSE

(71) Applicant: SIGMA COMPUTING, INC., San Francisco, CA (US)

(72) Inventors: Robert C. Woollen, San Rafael, CA (US); Joseph Bates, San Francisco, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 18/078,496

(22) Filed: Dec. 9, 2022

Related U.S. Application Data

(63) Continuation of application No. 16/925,067, filed on Jul. 9, 2020, now Pat. No. 11,580,079.

(60) Provisional application No. 62/931,457, filed on Nov. 6, 2019.

(51) Int. Cl.
| | |
|---|---|
| G06F 16/21 | (2019.01) |
| G06F 16/22 | (2019.01) |
| G06F 16/2457 | (2019.01) |
| G06F 16/28 | (2019.01) |
| G06F 21/62 | (2013.01) |

(52) U.S. Cl.
CPC .......... *G06F 16/21* (2019.01); *G06F 16/2282* (2019.01); *G06F 16/2457* (2019.01); *G06F 16/283* (2019.01); *G06F 21/6209* (2013.01)

(58) Field of Classification Search
None
See application file for complete search history.

(56) References Cited

U.S. PATENT DOCUMENTS

| | | | | |
|---|---|---|---|---|
| 8,180,789 B1* | 5/2012 | Wasserman | ........... | G06F 16/242 |
| | | | | 707/766 |
| 10,380,369 B1* | 8/2019 | Noe | ...................... | H04L 63/104 |
| 2003/0093408 A1* | 5/2003 | Brown | ................ | G06F 16/2272 |

(Continued)

FOREIGN PATENT DOCUMENTS

CN 109144978 A 1/2019

OTHER PUBLICATIONS

Bhatti et al., "Enabling policy-based access control in BI applications", Data & Knowledge Engineering, Elsevier BV, NL, vol. 66, No. 2, Aug. 2008, pp. 199-222, XP022758369, ISSN: 0169-023X, DOI: 10.1016/J.DATAK.2008.03.003.

(Continued)

*Primary Examiner* — Christopher J Raab

(57) ABSTRACT

Providing access to usage reports on a cloud-based data warehouse including maintaining, by a management module, a metadata table on the cloud-based data warehouse, wherein the metadata table comprises usage reports for a plurality of organizations; receiving, by the management module, a request for the metadata table from an administrator account for a first organization of the plurality of organizations; granting, by the management module, the administrator account permission to access a filtered portion of the metadata table, wherein the filtered portion of the metadata table is generated by filtering the metadata table by an organization identifier of the first organization; and providing, by the management module, the filtered portion of the metadata table to the administrator account.

20 Claims, 7 Drawing Sheets

(56) References Cited

U.S. PATENT DOCUMENTS

| | | | |
|---|---|---|---|
| 2008/0082540 A1* | 4/2008 | Weissman | G06F 16/289 |
| | | | 707/999.009 |
| 2008/0120296 A1 | 5/2008 | Kariathungal et al. | |
| 2010/0070461 A1 | 3/2010 | Vella et al. | |
| 2011/0247051 A1* | 10/2011 | Bulumulla | G06F 21/00 |
| | | | 726/4 |
| 2011/0289091 A1* | 11/2011 | Collins | G06Q 10/10 |
| | | | 707/741 |
| 2014/0074558 A1* | 3/2014 | Jain | G06Q 10/0637 |
| | | | 705/7.36 |
| 2015/0106489 A1* | 4/2015 | Duggirala | H04L 61/103 |
| | | | 709/222 |
| 2015/0154211 A1* | 6/2015 | Matsubara | H04L 67/01 |
| | | | 707/812 |
| 2016/0105409 A1* | 4/2016 | Torman | H04L 63/20 |
| | | | 726/6 |
| 2017/0011079 A1* | 1/2017 | Verma | H04L 67/535 |
| 2019/0303838 A1* | 10/2019 | Chung | G06F 16/908 |

OTHER PUBLICATIONS

International Search Report and Written Opinion, PCT/US2020/055336, Jan. 20, 2021, 12 pages.

* cited by examiner

PROVIDING ACCESS TO USAGE REPORTS ON A CLOUD-BASED DATA WAREHOUSE

BACKGROUND

Field of the Invention

The field of the invention is data processing, or, more specifically, methods, apparatus, and products for providing access to usage reports on a cloud-based data warehouse.

Description of Related Art

Modern businesses may store large amounts of data in remote databases within cloud-based data warehouses. This data may be accessed using database query languages, such as structured query language (SQL). However, different presentations and configurations of the data may require constructing complex queries, which may be difficult for most users. Providing a service to simplify the interaction between users and the database may result in a dissociation between the activities tracked by the database and the interactions between the users and the service.

SUMMARY

Methods, systems, and apparatus for providing access to usage reports on a cloud-based data warehouse. Providing access to usage reports on a cloud-based data warehouse includes maintaining, by a management module, a metadata table on the cloud-based data warehouse, wherein the metadata table comprises usage reports for a plurality of organizations; receiving, by the management module, a request for the metadata table from an administrator account for a first organization of the plurality of organizations; granting, by the management module, the administrator account permission to access a filtered portion of the metadata table, wherein the filtered portion of the metadata table is generated by filtering the metadata table by an organization identifier of the first organization; and providing, by the management module, the filtered portion of the metadata table to the administrator account.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
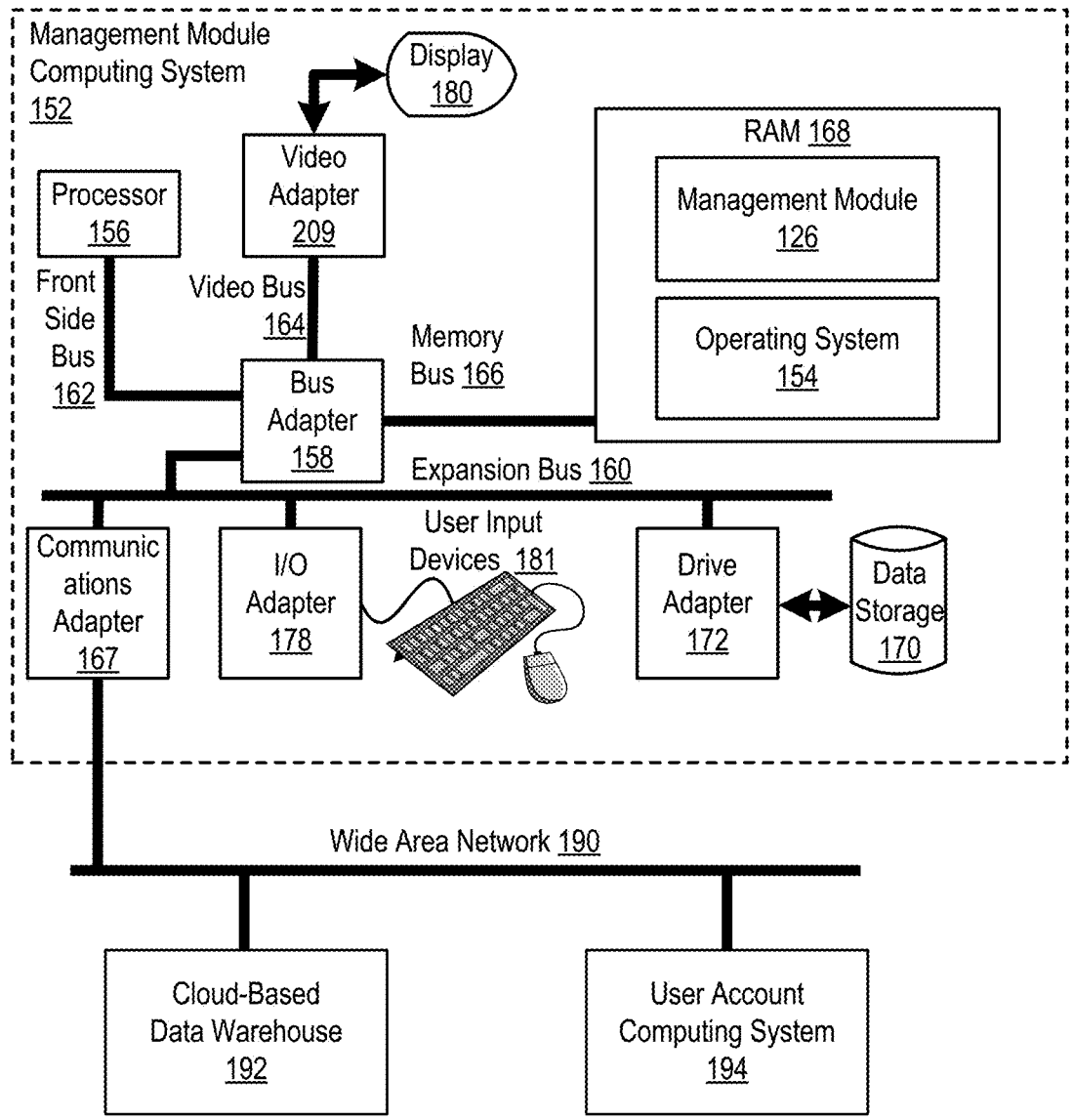
FIG. 1 sets forth a block diagram of an example system configured for providing access to usage reports on a cloud-based data warehouse according to embodiments of the present invention.

Exemplary methods, apparatus, and products for providing access to usage reports on a cloud-based data warehouse in accordance with the present invention are described with reference to the accompanying drawings, beginning with FIG. 1. FIG. 1 sets forth a block diagram of automated computing machinery comprising an exemplary computing system (152) configured for providing access to usage reports on a cloud-based data warehouse according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for providing access to usage reports on a cloud-based data warehouse according to embodiments of the present invention include UNIX™, Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the management module (126), a module for providing access to usage reports on a cloud-based data warehouse according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for providing access to usage reports on a cloud-based data warehouse according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for providing access to usage reports on a cloud-based data warehouse according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The user account computing system (194) is a computing system that accesses databases using the management module (126) on the computing system (152).

Figure 2:
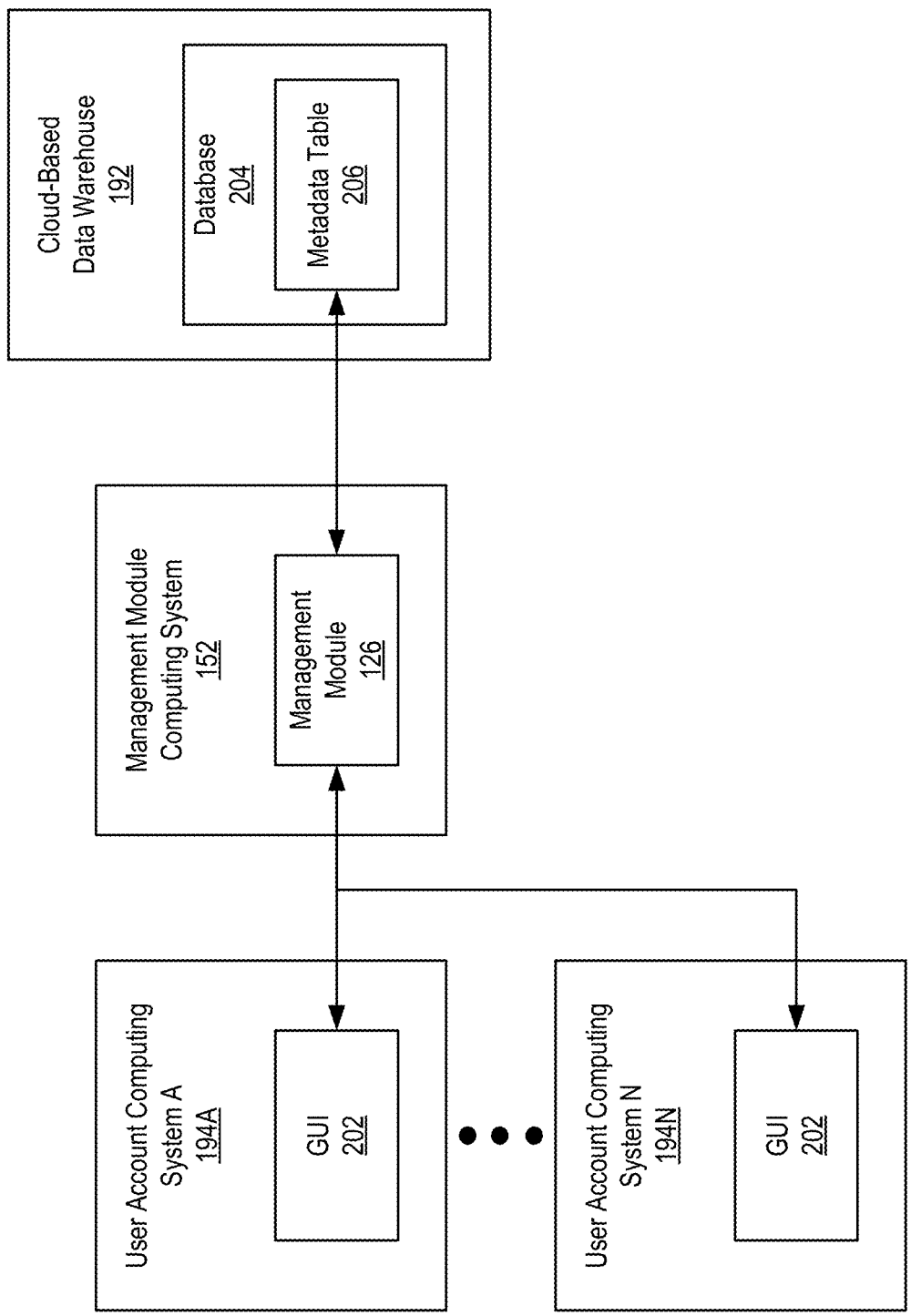
FIG. 2 sets forth a block diagram of an example system configured for providing access to usage reports on a cloud-based data warehouse according to embodiments of the present invention.

FIG. 2 shows an exemplary system for providing access to usage reports on a cloud-based data warehouse according to embodiments of the present invention. As shown in FIG. 2, the exemplary system includes multiple user account computing systems (user account computing system A (194A), user account computing system N (194N)), a management module computing system (152), and a cloud-based data warehouse (192). The user account computing systems (user account computing system A (194A), user account computing system N (194N)) each include a graphical user interface (GUI). The management module computing system (152) includes a management module (126). The cloud-based data warehouse (192) includes a database (204). The database (204) includes a metadata table (206).

The GUI (202) is a visual presentation configured to present worksheets to a user. A worksheet is a presentation of data from one or more data sources, including tables on a database (such as metadata table (206) on database (204)) or other worksheets. The GUI (202) also receives requests from a user (via a user account) for data from a data source. The GUI (202) may be presented, in part, by the management module (126) and displayed on the user account computing systems (user account computing system A (194A), user account computing system N (194N)) (e.g., on a system display or mobile touchscreen). The GUI (202) may be part of an Internet application that includes the management module (126) and is hosted on the management module computing system (152).

The user account computing systems (user account computing system A (194A), user account computing system N (194N)) are computing systems under the control of a user account. Each user account uses the GUI (202) to interact with data from databases (not shown) via worksheets generated by the management module (126). As each user account computing system (user account computing system A (194A), user account computing system N (194N)) interacts with the management module (126), the management module (126) collects metadata about the interaction and stores the metadata in one or more metadata tables (206). Such interactions (referred to as usage reports) include queries run, documents created, worksheets created, formulas added, worksheet changes made, etc. Such metadata may be stored in separate metadata tables. For example, the management module (126) may use a users metadata table to store user account metadata (e.g., name, email, creation date, update date, etc.), a connections metadata table to store connections created to different data sources and different cloud-based data warehouses (i.e., connection ID, name, type, description, creation date, etc.), a team members metadata table to store user accounts that belong to a team within an organization (e.g., team ID, user ID, team role, etc.), and an events metadata table to store interactions between a user account and the GUI (202) (e.g., event time, user ID, event type, etc.).

The database, such as database (204), is a collection of data sources and management systems for the data. A data source is a collection of related data on the database (204). Examples of data sources include tables, schemas, and folders. Data from the data sources may be organized into columns and rows. The particular columns, rows, and organization of the columns and rows that make up data may be specified in a database query requesting the data.

The management module (126) is hardware, software, or an aggregation of hardware and software configured to receive requests from the user account computing systems (user account computing system A (194A), user account computing system N (194N)), via the GUI (GUI). The management module (126) is also configured to generate database queries in response to requests for data and manipulations of that data via the spreadsheet interface in the GUI (202). The management module (126) may include a database query generator that generates a database query.

The management module (126) presents, via the spreadsheet interface in the GUI (202), a worksheet using the information in the worksheet metadata. Worksheet metadata is data that describes a worksheet. Specifically, the worksheet metadata may include a description of the data sources and a worksheet architecture. The description of the data sources describes which data is to be requested via the database query or retrieved from another worksheet. The description of the data set may include which columns and rows of data from the data source are to be retrieved from the database (206) via the database query. The data presented in the worksheet may be referred to as the underlying data (i.e., the data upon which the worksheet is created).

The worksheet architecture includes the functions to be applied to the data and the presentation structure of the data. The functions to be applied to the data may include the manipulations of the data in the columns and rows received in the data. Such manipulations may include calculation columns that apply a function to data in the data. The presentation structure of the data may include presentation selections made by a user. The presentation structure may include the hierarchical relationship between the columns, filters applied to the data, and the manner in which the data is sorted. The presentation structure of the data may also include the GUI visibility of a particular subset of the data. GUI visibility may be altered based on filter settings of the data or on the visibility status (e.g., hidden or not hidden) of a column within the data. The presentation structure of the data may also include the formatting of the worksheet, such as the size of rows and columns.

Each user account may be associated with an organization. An organization is a collection of user accounts managed at least in part by an administrator account. For example, a company may have its employees utilize the management module (126) to access customer data from a database. Each employee is issued a user account. One employee may be designated the administrator of the group and be issued an administrator account.

An administrator account is a type of user account that manages other user accounts. The administrator account may have special privileges greater than those enjoyed by standard user accounts. For example, an administrator account may be able to create and delete other user accounts. Further, an administrator account may be able to grant or deny user accounts access to different data sources owned or accessible by the organization.

As part of the administrative role, a holder of an administrator account may want to make use of the metadata gathered by the management module (126) and stored in the metadata table or tables. However, the metadata tables may be owned by the management module (126) and may contain metadata for users outside of the administrator account's organization. Therefore, simply granting, by the management module (126), access to the metadata table by the administrator account may expose data about other organization's users.

Figure 3:
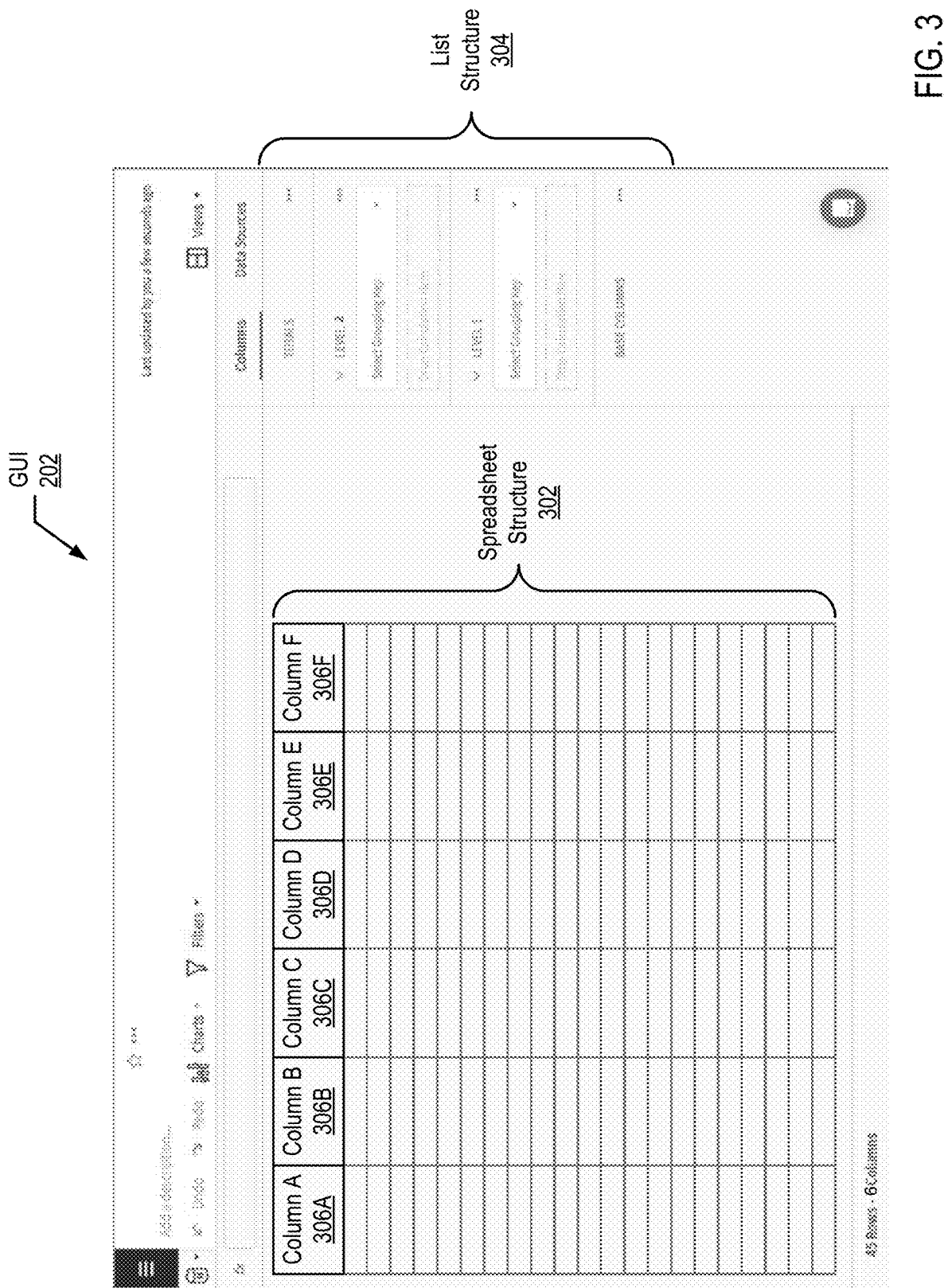
FIG. 3 sets forth a block diagram of an example system configured for providing access to usage reports on a cloud-based data warehouse according to embodiments of the present invention.

FIG. 3 shows an exemplary system for providing access to usage reports on a cloud-based data warehouse according to embodiments of the present invention. As shown in FIG. 3, the exemplary GUI (202) includes a spreadsheet structure (302), a list structure (304), and an exposable parameter (306). The spreadsheet structure (302) includes a worksheet (shown as empty rows) with six columns (column A (306A), column B (306B), column C (306C), column D (306D), column E (306E), column F (306F)).

The spreadsheet structure (302) is a graphical element and organizing mechanism for a worksheet that presents a data set. A worksheet is a presentation of a data set from a database (204). The spreadsheet structure (302) displays the worksheet as rows of data organized by columns (column A (306A), column B (306B), column C (306C), column D (306D), column E (306E), column F (306F)). The columns delineate different categories of the data in each row of the worksheet. The columns may also be calculation columns that include calculation results using other columns in the worksheet.

The list structure (304) is a graphical element used to define and organize the hierarchical relationships between the columns (column A (306A), column B (306B), column C (306C), column D (306D), column E (306E), column F (306F)) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (304) presents a dimensional hierarchy to the user. Specifically, the list structure (304) presents levels arranged hierarchically across at least one dimension. Each level within the list structure (304) is a position within a hierarchical relationship between columns (column A (306A), column B (306B), column C (306C), column D (306D), column E (306E), column F (306F)). The keys within the list structure (304) identify the one or more columns that are the participants in the hierarchical relationship. Each level may have more than one key.

One of the levels in the list structure (304) may be a base level. Columns selected for the base level provide data at the finest granularity. One of the levels in the list structure (304) may be a totals or root level. Columns selected for the totals level provide data at the highest granular level. For example, the totals level may include a field that calculates the sum of each row within a single column of the entire data set (i.e., not partitioned by any other column).

The GUI (202) may enable a user to drag and drop columns (column A (306A), column B (306B), column C (306C), column D (306D), column E (306E), column F (306F)) into the list structure (304). The order of the list structure (304) may specify the hierarchy of the columns relative to one another. A user may be able to drag and drop the columns in the list structure (304) at any time to redefine the hierarchical relationship between columns. The hierarchical relationship defined using the columns selected as keys in the list structure (304) may be utilized in charts such that drilling down (e.g., double click on a bar), enables a new chart to be generated based on a level lower in the hierarchy.

The GUI (202) may also include a mechanism for a user to request data from a database to be presented as a worksheet in the GUI (202). Such a mechanism may be part of the interactivity of the worksheet. Specifically, a user may manipulate a worksheet (e.g., by dragging and dropping columns or rows, resorting columns or rows, etc.) and, in response, the GUI (202) may generate request (e.g., in the form of a state specification) for data and send the request to the data analyzer (126). Such a mechanism may also include a direct identification of the rows and columns of a database data set that a user would like to access (e.g., via a selection of the rows and columns in a dialog box).

Figure 4:
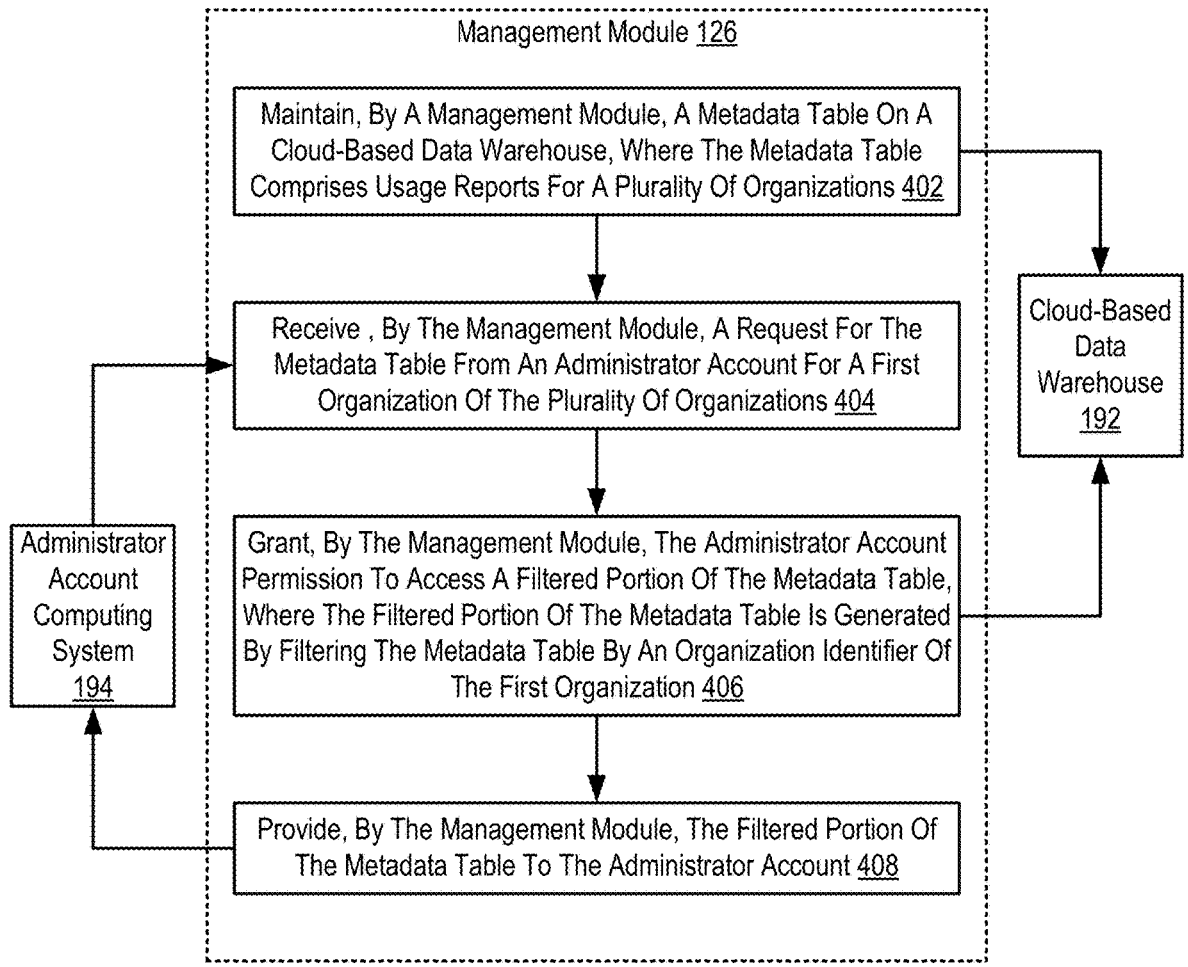
FIG. 4 sets forth a flow chart illustrating an exemplary method for providing access to usage reports on a cloud-based data warehouse according to embodiments of the present invention.

For further explanation, FIG. 4 sets forth a flow chart illustrating an exemplary method for providing access to usage reports on a cloud-based data warehouse according to embodiments of the present invention that includes maintaining (402), by a management module (126), a metadata table on a cloud-based data warehouse (192), wherein the metadata table comprises usage reports for a plurality of organizations. Maintaining (402), by a management module (126), a metadata table on a cloud-based data warehouse (192), wherein the metadata table comprises usage reports for a plurality of organizations may be carried out by monitoring interactions between the management module (126) and user accounts associated each of the plurality of organizations. Each interaction may be stored in a metadata table. The metadata table may include a field for organization but may not otherwise segregate user accounts from one organization from user accounts from another organization.

The method of FIG. 4 further includes receiving (404), by the management module (126), a request for the metadata table from an administrator account for a first organization of the plurality of organizations. Receiving (404), by the management module (126), a request for the metadata table from an administrator account for a first organization of the plurality of organizations may be carried out by the administrator account initiating the request via the GUI on the administrator account computing system (194). The request may include the name of organization, specific user accounts, and/or identifiers of the desired metadata.

Receiving the request for the metadata table may also include determining if the administrator account is authorized to access the metadata table. Authorization to access a metadata table may be independent of the administrator account's authorization to perform management operations on the user accounts within the organization. For example, the management module (126) may restrict access to metadata tables to only a specific tier of organization administrator accounts.

The method of FIG. 4 further includes granting (406), by the management module (126), the administrator account permission to access a filtered portion of the metadata table, wherein the filtered portion of the metadata table is generated by filtering the metadata table by an organization identifier of the first organization. Granting (406), by the management module (126), the administrator account permission to access a filtered portion of the metadata table, wherein the filtered portion of the metadata table is generated by filtering the metadata table by an organization identifier of the first organization may be carried out by the management module (126) interacting with the cloud-based data warehouse (192) to authorize access by the administrator account. Access to the metadata table may be granted directly to the administrator account (via the management module (126)) or via an authorized connection between the management module (126) and the cloud-based data warehouse (192).

The filtered portion of the metadata table may be generated by the management module (126) selecting a filter based on the administrator account request and organization. For example, the filtered metadata table may be generated by filtering out all records associated with users outside of the administration account's organization. As another example, the filtered metadata table may be generated by filtering out all records associated with users not specified in the request.

The administrator account for the organization is granted access to only those portions of the metadata table allowed by the management module (126) and is denied access to portions of the metadata table outside of the filtered portion of the metadata table. However, no changes to the metadata table are made on the cloud-based data warehouse. In other words, the metadata table or tables are not altered to allow the administrator account access to the filtered portion of the metadata table.

The method of FIG. 4 further includes providing (408), by the management module (126), the filtered portion of the metadata table to the administrator account. Providing (408), by the management module (126), the filtered portion of the metadata table to the administrator account may be carried out by creating an indication in the GUI on the administrator account computing system (194) that the metadata table is enabled for use as a data source for a worksheet. The metadata table may then be used as a data source for a worksheet in the same way as any other data source would be used by the user accounts to create worksheets.

As an example of the above, consider a vending machine company that places vending machines in hospitals. The administrator for the vending machine company may employ the services provided by the management module (126). Specifically, the administrator account for the vending machine company may manage a group of hospital managers as users to provide information about the utilization of the vending machines (such as rate of use, most popular item, cashflow, etc.) via the management module (126). The administrator may want to determine how frequently the hospital managers are checking this data or how thoroughly the hospital managers are exploring the data. To this end, the administrator may want access to a metadata table maintained by the management module (126).

Continuing with the example, the administrator initiates a request for the metadata table that is received by the management module (126). The management module (126) then generates a filtered portion of the metadata table that includes only the users associated with the vending machine company. The management module (126) then grants permission to the administrator to access the filtered portion of the metadata table. Finally, the management module (126) provides an indication in the GUI on the administrator account computing system (194) that the metadata table is enabled for use as a data source for a worksheet.

The above limitations improve the operation of the computer system by enabling partial access to metadata tables to an administrator of a subset of the users tracked in the table. Further, granting permission to access a metadata table on a cloud-based data warehouse enables the administrator to access continually updated data instead of a downloaded table that becomes immediately stale. Further, for large organizations, the filtered portion of the metadata table may be so large as to be unwieldy to download and access locally. Finally, the management module (126) enables the administrator to combine the filtered portion of the metadata table with other data sources to gain further insight into how an organization uses the management module (126).

Figure 5:
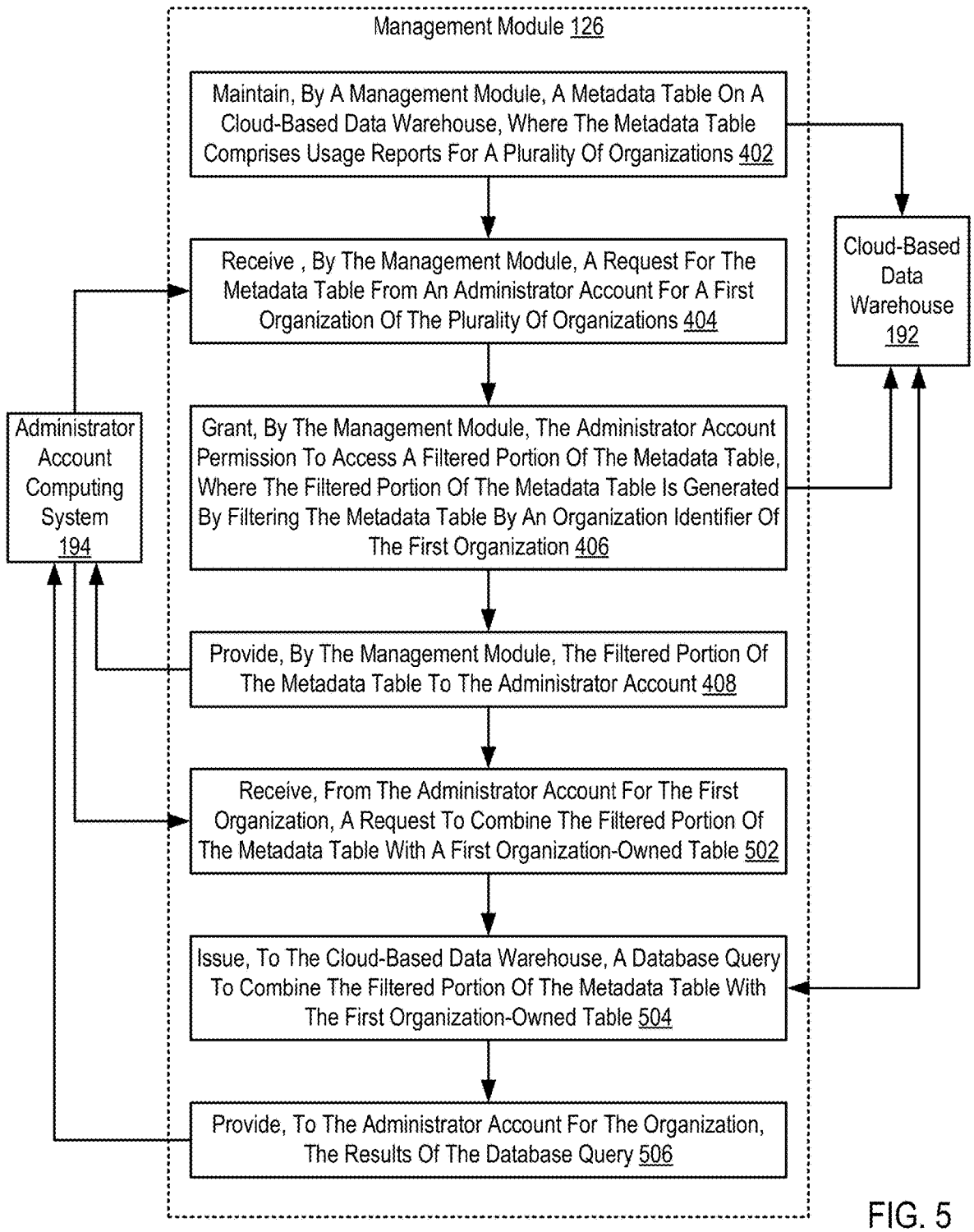
FIG. 5 sets forth a flow chart illustrating an exemplary method for providing access to usage reports on a cloud-based data warehouse according to embodiments of the present invention.

For further explanation, FIG. 5 sets forth a flow chart illustrating a further exemplary method for providing access to usage reports on a cloud-based data warehouse according to embodiments of the present invention that includes maintaining (402), by a management module (126), a metadata table on a cloud-based data warehouse (192), wherein the metadata table comprises usage reports for a plurality of organizations; receiving (404), by the management module (126), a request for the metadata table from an administrator account for a first organization of the plurality of organizations; granting (406), by the management module (126), the administrator account permission to access a filtered portion of the metadata table, wherein the filtered portion of the metadata table is generated by filtering the metadata table by an organization identifier of the first organization; and providing (408), by the management module (126), the filtered portion of the metadata table to the administrator account.

The method of FIG. 5 differs from the method of FIG. 4, however, in that the method of FIG. 5 further includes receiving (502), from the administrator account for the first organization, a request to combine the filtered portion of the metadata table with a first organization-owned table; issuing (504) a database query to combine the filtered portion of the metadata table with the first organization-owned table; and providing (506), to the administrator account for the organization, the results of the database query.

Once the administrator account has been granted permission to access the filtered portion of the metadata table, the administrator account may then utilize the metadata table in a worksheet as the administrator account would any other data source. The administrator account may want to compare information in the metadata table to data from another organization-owned table.

Receiving (502), from the administrator account for the first organization, a request to combine the filtered portion of the metadata table with a first organization-owned table may be carried out by administrator account interacting with the GUI on the administrator account computing system (194) to select the filtered portion of the metadata table and the organization-owned table for combination. The indication may also include a foreign key used to indicate the columns and rows to match between the tables. An organization-owned table is a table from a database under the control of the organization.

Issuing (504) a database query to combine the filtered portion of the metadata table with the first organization-owned table may be carried out by the management module (126) selecting query statements (such as join statements) for a database query whose results would be a combination of the filtered portion of the metadata table and the organization-owned table. The database query may be a structured query language (SQL) query. Providing (506), to the administrator account for the organization, the results of the database query may be carried out by the management module (126) organizing the results of the database query into a worksheet presented via the GUI on the administrator account computing system (194).

Figure 6:
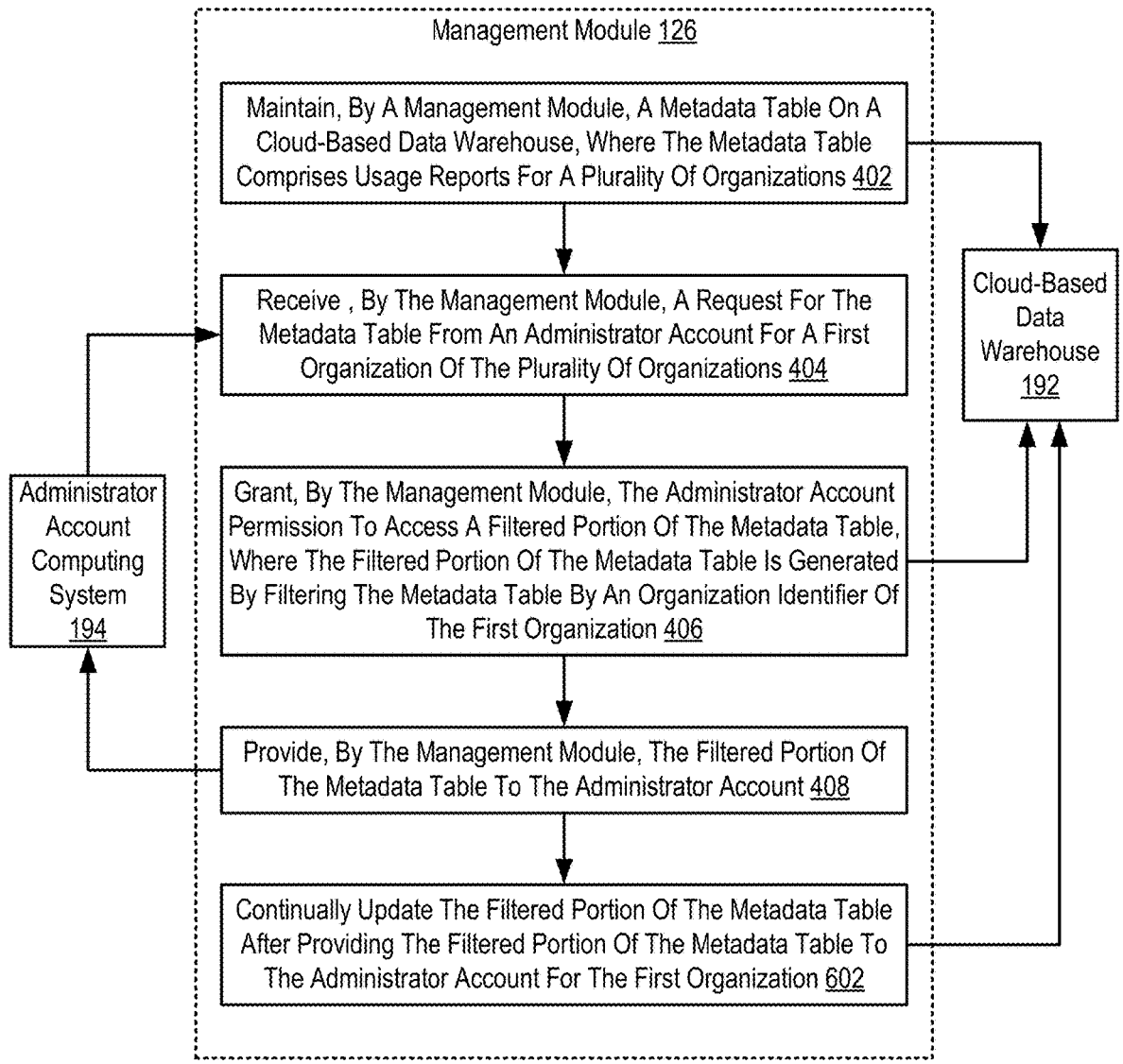
FIG. 6 sets forth a flow chart illustrating an exemplary method for providing access to usage reports on a cloud-based data warehouse according to embodiments of the present invention.

For further explanation, FIG. 6 sets forth a flow chart illustrating a further exemplary method for providing access to usage reports on a cloud-based data warehouse according to embodiments of the present invention that includes maintaining (402), by a management module (126), a metadata table on a cloud-based data warehouse (192), wherein the metadata table comprises usage reports for a plurality of organizations; receiving (404), by the management module (126), a request for the metadata table from an administrator account for a first organization of the plurality of organizations; granting (406), by the management module (126), the administrator account permission to access a filtered portion of the metadata table, wherein the filtered portion of the metadata table is generated by filtering the metadata table by an organization identifier of the first organization; and providing (408), by the management module (126), the filtered portion of the metadata table to the administrator account.

The method of FIG. 6 differs from the method of FIG. 4, however, in that the method of FIG. 6 further includes continually updating (602) the filtered portion of the metadata table after providing the filtered portion of the metadata table to the administrator account for the first organization. Continually updating (602) the filtered portion of the metadata table after providing the filtered portion of the metadata table to the administrator account for the first organization may be carried out by the management module (126) monitoring interactions between the management module (126) and user accounts associated with the organization. The interactions may continually be stored in the metadata table, including the filtered portion of the metadata table utilized by the administrator account.

Figure 7:
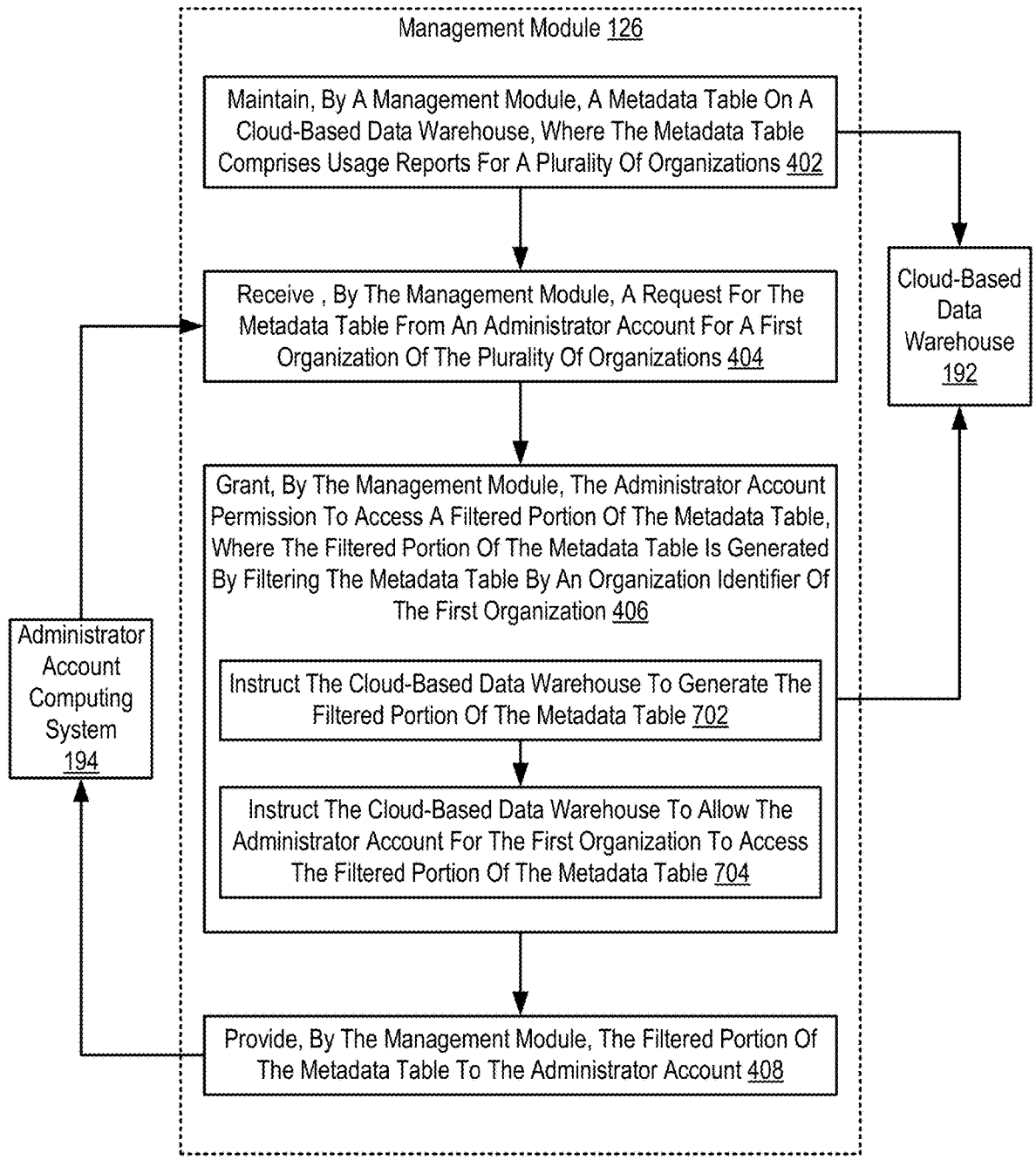
FIG. 7 sets forth a flow chart illustrating an exemplary method for providing access to usage reports on a cloud-based data warehouse according to embodiments of the present invention.

For further explanation, FIG. 7 sets forth a flow chart illustrating a further exemplary method for providing access to usage reports on a cloud-based data warehouse according to embodiments of the present invention that includes maintaining (402), by a management module (126), a metadata table on a cloud-based data warehouse (192), wherein the metadata table comprises usage reports for a plurality of organizations; receiving (404), by the management module (126), a request for the metadata table from an administrator account for a first organization of the plurality of organizations; granting (406), by the management module (126), the administrator account permission to access a filtered portion of the metadata table, wherein the filtered portion of the metadata table is generated by filtering the metadata table by an organization identifier of the first organization; and providing (408), by the management module (126), the filtered portion of the metadata table to the administrator account.

The method of FIG. 7 differs from the method of FIG. 4, however, in that granting (406), by the management module (126), the administrator account permission to access a filtered portion of the metadata table, wherein the filtered portion of the metadata table is generated by filtering the metadata table by an organization identifier of the first organization includes instructing (702) the cloud-based data warehouse (192) to generate the filtered portion of the metadata table; and instructing (704) the cloud-based data warehouse (192) to allow the administrator account for the first organization to access the filtered portion of the metadata table.

Instructing (702) the cloud-based data warehouse (192) to generate the filtered portion of the metadata table may be carried out by the management module (126) providing the cloud-based data warehouse (192) with a description of the filtered portion of the metadata table, such as an identifier of the metadata table and an entry by which the metadata table is to be filtered. Instructing (704) the cloud-based data warehouse (192) to allow the administrator account for the first organization to access the filtered portion of the metadata table may be carried out by the management module (126) creating credentials to access the filtered portion of the metadata table or adding access to the filtered portion of the metadata table using existing credentials. In response, the cloud-based data warehouse (192) may provide the management module (126) with a pointer to the filtered portion of the metadata table.

In view of the explanations set forth above, readers will recognize that the benefits of providing access to usage reports on a cloud-based data warehouse according to embodiments of the present invention include:
  Improving the operation of a computing system by enabling partial access to metadata tables to an administrator of a subset of the users tracked in the table, increasing computing system efficiency and usability.
  Improving the operation of a computing system by enabling third-party access to a remote, managed, continually update data source for combination with other data sources into a worksheet, increasing computing system efficiency and usability.

Exemplary embodiments of the present invention are described largely in the context of a fully functional computer system for providing access to usage reports on a cloud-based data warehouse. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing access to usage reports on a cloud-based data warehouse, the method comprising:
   maintaining, by a management module, a metadata table on the cloud-based data warehouse, wherein the metadata table comprises usage reports for a plurality of organizations, and wherein;
   maintaining the metadata table comprises monitoring interactions between the management module and user accounts associated with each of the plurality of organizations; and
   the management module comprises a system separate from the cloud-based data warehouse and operates as an intermediary between user accounts and the cloud-based data warehouse to receive requests from a user, generate one or more queries based on the request, transmit the queries to the cloud-based data warehouse, and present, to the user, responses to the queries from the data warehouse;
   receiving, by the management module from an administrator account for a first organization of the plurality of organizations, a request for the metadata table comprising the usage reports for the plurality of organizations;
   granting, by the management module, the administrator account permission to access a filtered portion of the requested metadata table, wherein the filtered portion of the requested metadata table is generated by filtering the requested metadata table by an organization identifier of the first organization; and
   providing, by the management module, the filtered portion of the requested metadata table to the administrator account.

2. The method of claim 1, further comprising continually updating the filtered portion of the metadata table after providing the filtered portion of the metadata table to the administrator account for the first organization.

3. The method of claim 1, wherein granting, by the management module, the administrator account permission to access the filtered portion of the requested metadata table comprises:
   instructing the cloud-based data warehouse to generate the filtered portion of the requested metadata table; and
   instructing the cloud-based data warehouse to allow the administrator account for the first organization to access the filtered portion of the requested metadata table.

4. The method of claim 1, wherein the administrator account for the first organization is denied access to portions of the requested metadata table outside of the filtered portion of the requested metadata table.

5. The method of claim 1, wherein providing, by the management module, the filtered portion of the requested metadata table to the administrator account comprises enabling the filtered portion of the requested metadata table for use as a data source for a worksheet.

6. The method of claim 1, wherein the management module does not segregate entries in the metadata table between different organizations of the plurality of organizations.

7. The method of claim 1, wherein the request for the metadata table is received from a user account computing system.

8. An apparatus for providing access to usage reports on a cloud-based data warehouse, the apparatus comprising a computer processor and computer memory operatively coupled to the computer processor, the computer memory having disposed within it computer program instructions that, when executed by the computer processor, cause the apparatus to carry out the steps of:
   maintaining, by a management module, a metadata table on the cloud-based data warehouse, wherein the metadata table comprises usage reports for a plurality of organizations, wherein:
   maintaining the metadata table comprises monitoring interactions between the management module and user accounts associated with each of the plurality of organizations; and
   the management module comprises a system separate from the cloud-based data warehouse and operates as an intermediary between user accounts and the cloud-based data warehouse to receive requests from a user, generate one or more queries based on the request, transmit the queries to the cloud-based data warehouse, and present, to the user, responses to the queries from the data warehouse;
   receiving, by the management module from an administrator account for a first organization of the plurality of organizations, a request for the metadata table comprising the usage reports for the plurality of organizations;
   granting, by the management module, the administrator account permission to access a filtered portion of the requested metadata table, wherein the filtered portion of the requested metadata table is generated by filtering the requested metadata table by an organization identifier of the first organization; and
   providing, by the management module, the filtered portion of the requested metadata table to the administrator account.

9. The apparatus of claim 8, wherein the computer program instructions further cause the apparatus to carry out the step of continually updating the filtered portion of the metadata table after providing the filtered portion of the metadata table to the administrator account for the first organization.

10. The apparatus of claim 8, wherein granting, by the management module, the administrator account permission to access the filtered portion of the requested metadata table comprises:
    instructing the cloud-based data warehouse to generate the filtered portion of the requested metadata table; and
    instructing the cloud-based data warehouse to allow the administrator account for the first organization to access the filtered portion of the requested metadata table.

11. The apparatus of claim 8, wherein the administrator account for the first organization is denied access to portions of the requested metadata table outside of the filtered portion of the requested metadata table.

12. The apparatus of claim 8, wherein providing, by the management module, the filtered portion of the requested metadata table to the administrator account comprises enabling the filtered portion of the requested metadata table for use as a data source for a worksheet.

13. The apparatus of claim 8, wherein the management module does not segregate entries in the metadata table between different organizations of the plurality of organizations.

14. The apparatus of claim 8, wherein the request for the metadata table is received from a user account computing system.

15. A computer program product for providing access to usage reports on a cloud-based data warehouse, the computer program product disposed upon a non-transitory computer readable storage medium, the computer program product comprising computer program instructions that, when executed, cause a computer to carry out the steps of:

maintaining, by a management module, a metadata table on the cloud-based data warehouse, wherein the metadata table comprises usage reports for a plurality of organizations, wherein:

maintaining the metadata table comprises monitoring interactions between the management module and user accounts associated with each of the plurality of organizations; and the management module comprises a system separate from the cloud-based data warehouse and operates as an intermediary between user accounts and the cloud-based data warehouse to receive requests from a user, generate one or more queries based on the request, transmit the queries to the cloud-based data warehouse, and present, to the user, responses to the queries from the data warehouse;

receiving, by the management module from an administrator account for a first organization of the plurality of organizations, a request for the metadata table comprising the usage reports for the plurality of organizations;

granting, by the management module, the administrator account permission to access a filtered portion of the requested metadata table, wherein the filtered portion of the requested metadata table is generated by filtering the requested metadata table by an organization identifier of the first organization; and providing, by the management module, the filtered portion of the requested metadata table to the administrator account.

16. The computer program product of claim 15, wherein the computer program instructions further cause the computer to carry out the step of continually updating the filtered portion of the metadata table after providing the filtered portion of the metadata table to the administrator account for the first organization.

17. The computer program product of claim 15, wherein granting, by the management module, the administrator account permission to access the filtered portion of the requested metadata table comprises:

instructing the cloud-based data warehouse to generate the filtered portion of the requested metadata table; and instructing the cloud-based data warehouse to allow the administrator account for the first organization to access the filtered portion of the requested metadata table.

18. The computer program product of claim 15, wherein the administrator account for the first organization is denied access to portions of the requested metadata table outside of the filtered portion of the requested metadata table.

19. The computer program product of claim 15, wherein providing, by the management module, the filtered portion of the requested metadata table to the administrator account comprises enabling the filtered portion of the requested metadata table for use as a data source for a worksheet.

20. The computer program product of claim 15, wherein the management module does not segregate entries in the metadata table between different organizations of the plurality of organizations.

* * * * *